Dec. 9, 1969    J. PHILLIPS    3,483,409
BEARING AND END SHIELD ARRANGEMENT FOR DYNAMOELECTRIC
MACHINE AND METHOD OF ASSEMBLING SAME
Filed Dec. 15, 1967    2 Sheets-Sheet 1

Inventor
Jerome Phillips
By Joseph A. Hemignani
Attorney

Dec. 9, 1969 J. PHILLIPS 3,483,409
BEARING AND END SHIELD ARRANGEMENT FOR DYNAMOELECTRIC
MACHINE AND METHOD OF ASSEMBLING SAME
Filed Dec. 15, 1967 2 Sheets-Sheet 2
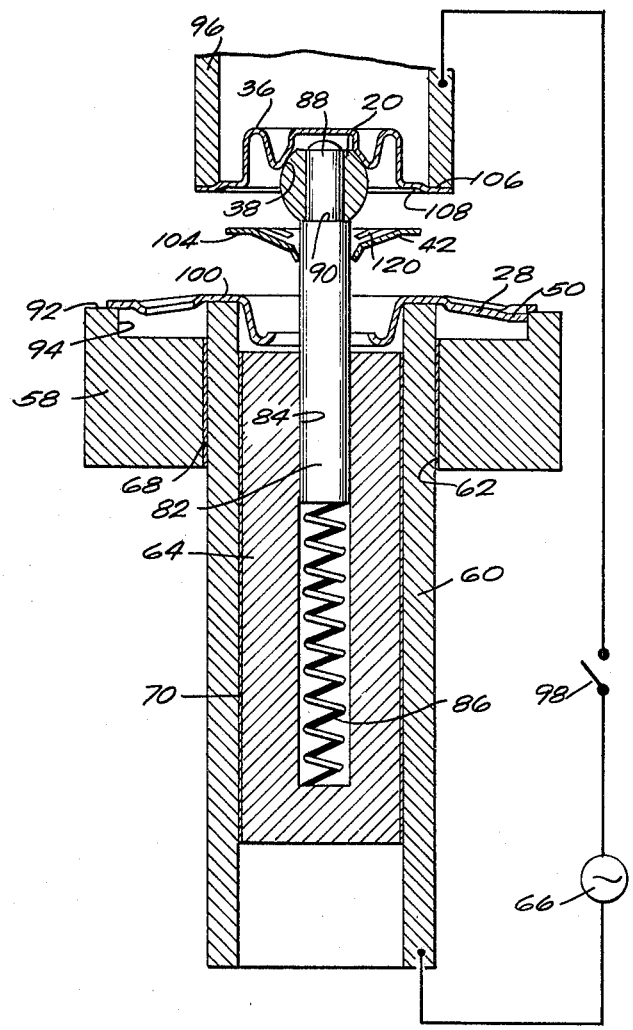
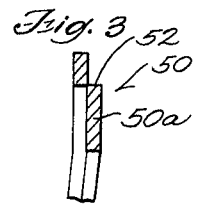
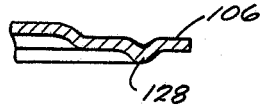
Inventor
Jerome Phillips
By Joseph A. Semignani
Attorney

United States Patent Office 3,483,409
Patented Dec. 9, 1969

3,483,409
BEARING AND END SHIELD ARRANGEMENT FOR DYNAMOELECTRIC MACHINE AND METHOD OF ASSEMBLING SAME
Jerome Phillips, Owosso, Mich., assignor to Control Company of America, Melrose Park, Ill., a corporation of Delaware
Filed Dec. 15, 1967, Ser. No. 690,865
Int. Cl. H02k 5/16, 5/04
U.S. Cl. 310—90                                  16 Claims

ABSTRACT OF THE DISCLOSURE

An end frame is provided with register tabs which are used to locate the end frame in a fixture for assembly purposes and subsequently in the dynamoelectric machine. The register tabs are arranged concentrically with a bearing support in the fixture and connection of the bearing to the end frame is made while the bearing is engaged with the fixture bearing support so that the bearing is connected to the end frame in concentric relationship with the register tabs. The end frame, with bearing attached, is connected to the stator of a dynamoelectric machine with the register tabs engaging register surfaces connected to the stator and concentric with the stator bore. The bearing and a rotor supported by the bearing are thus located in concentric relationship with the stator bore through engagement between the register tabs and the stator register surfaces. A rubber mounting ring is frictionally held on the end frame and a "Permawick" lubrication material is injected around the bearing.

BACKGROUND OF INVENTION

Field of invention

This invention relates to bearing arrangements for dynamoelectric machines and to the method of assembling such bearing arrangements and the dynamoelectric machine.

Description of prior art

It is conventional in the manufacture of electric motors, or other dynamoelectric machinery, to provide a uniform air gap between the rotor, or armature, and stator. One of the reasons for providing the uniform air gap is to minimize internal magnetic noise. With that end in mind, it has been recognized that close tolerances should be held on the concentricity of the bearing surface with respect to the stator surface confronting the rotor or armature. Heretofore, complex bearing support arrangements, involved machining operations and/or complex machining fixtures have been used to this end and none of these attempts have been completely satisfactory.

SUMMARY OF INVENTION

In accordance with this invention, a bearing support for a dynamoelectric machine is provided with register surfaces which have a preselected orientation on the bearing support member. With the register surfaces on the bearing support member, that member can be positioned in a fixture with the bearing support member register surfaces engaging complementary register surfaces on the fixture. The fixture register surfaces have a preselected relationship with a bearing support in the fixture, preferably this preselected relationship is a concentric relationship. The bearing is then connected to the bearing support member while maintaining the preselected relationship between the bearing and the fixture register surfaces. Accordingly, the bearing, when connected to the bearing support member, also has a preselected relationship with respect to the register surfaces on the bearing support member. The bearing support member is then connected to the dynamoelectric machine stator with the bearing support member register surfaces engaging register surfaces on the stator. The stator register surfaces have the same preselected relationship with the surface of the stator which will confront a rotor as the bearing support member register surfaces have with the bearing, again preferably this is a concentric relationship. The bearing support member is connected to the stator with its register surfaces engaging the stator register surfaces so that the bearing, and a rotor supported by the bearing, have the preselected relationship with the stator surface.

DESCRIPTIONS OF DRAWINGS

Figure 1:
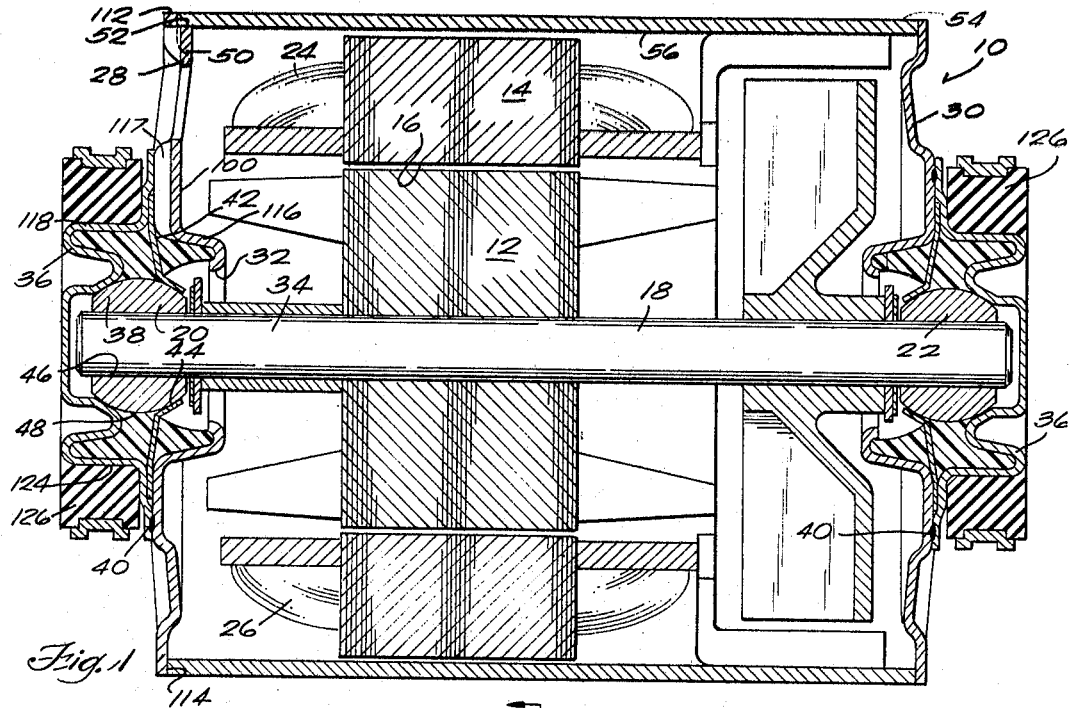
Figure 2:
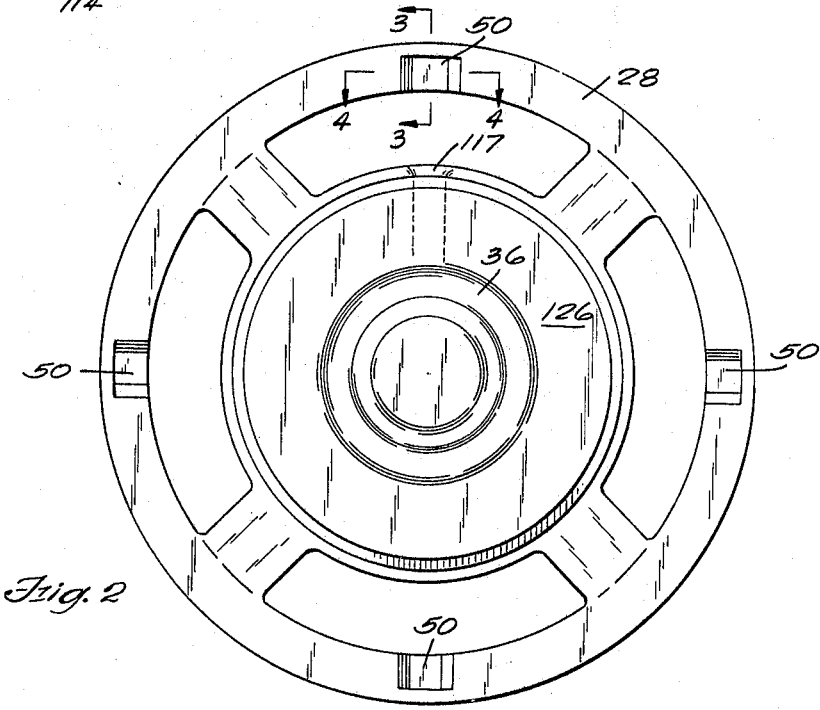

FIG. 1 is an axial section through a motor incorporating this invention;
FIG. 2 is an end view of the motor;
FIG. 3 is a section view along line 3—3 of FIG. 2;
FIG. 4 is a section view along line 4—4 of FIG. 2;
FIG. 5 is a section through an assembly fixture illustrating the method of assembly; and
FIG. 6 is an enlarged view of a portion of an alternative form of bearing plate.

DESCRIPTION OF PREFERRED EMBODIMENT

This invention is illustrated in connection with an electric motor 10, see FIG. 1. The motor includes an armature, or rotor, 12 and a stator 14. The stator has an internal bore 16 and the armature is positioned within the bore. Armature shaft 18 projects from both axial ends of the armature where the shaft is supported for rotation within the stator bore by bearings 20 and 22. Coils 24 and 26 are supported on the stator in a conventional manner and a suitable brush assembly (not shown) can be associated with the armature also in a conventional manner. When the motor is energized, the armature rotates within the bore.

One of the problems encountered in operation of an electric motor, or dynamoelectric machines in general, is magnetic noise and one of the factors in controlling magnetic noise is the concentric relation of the armature with the inside diameter of the stator bore. This invention is concerned with this problem and proposes as a solution an arrangement which results in more facile and accurate control over the concentric relationship between the stator bore and the inside diameter of bearings 20 and 22, the bearing determining the relationship between the armature and the stator.

Before discussing the manner of assembly, the bearing arrangement and related motor structure will be described. The motor includes end frames 28 and 30 which establish the connection between bearings 20 and 22 and the stator. Since both end frames and bearing arrangements are identical, only one will be described. End frame 28 includes a central opening 32 through which end 34 of the armature shaft extends. Bearing plate 36 is generally centered on the axis of the armature and overlies opening 32 and a portion of the end frame surrounding that opening. The bearing plate includes a generally conical section surface 38 and is attached to the end frame by weld connection 40. A generally annular bearing retainer spring 42 is clamped between the bearing plate and the end frame. The bearing retainer spring also includes a generally conical section surface 44, it being appreciated that this surface and surface 38 could be spherical if desired. Bearing 20 has a central bore 46 and an outer spherical surface 48. The conical section surfaces 38 and 44 are generally concentric with each other and with the spherical surface of the bearing, the centers of the conical surfaces and the spherical surface of the bearing being on the axis of the bearing bore. The conical section surfaces are disposed on opposite sides of the bearing center and are opposed to each other so that the bearing is securely held against axial movement between the conical sections.

The end frame is located in the motor by register tabs 50. The configuration of the tabs will be described more completely hereinafter. At this point it should be noted that the tabs have surfaces 52 which face radially outward with respect to the bearing and armature axis. Surfaces 52 engage the inner surface of a generally cylindrical housing portion 54 which fits over the outside of and is fixed to stator 14. Engagement between tabs 50 and housing portion 54 locates the end frame relative to the stator.

Tabs 50 are angularly spaced around the axis of the bearing and the armature, more specifically around the center of opening 32 in the end plate. The register tabs, in addition to serving to locate the end frame in the motor, are also useful in locating the bearing on the end frame in an assembly fixture so that the bearing can be made to assume a preselected relationship with respect to the register tabs and through the tabs will have a preselected relationship with the stator. To this end, housing portion 54, or specifically the inner surface 56 thereof, is concentric with bore 16 so that by insuring concentricity between the register tabs and the inside diameter of bearing 20 the bearing will be concentric with the stator bore when connected in the motor to thereby establish a concentric relationship between the armature and the stator bore. In the method of assembly in accordance with this invention register tabs 50 are utilized to locate the end frame in an assembly fixture, the fixture also being adapted to hold bearing 20 in concentric relationship with the tabs as the connection of the bearing to the end frame is made.

The fixture illustrated in FIG. 5 is an example of one of a variety of fixtures which could be used in assembling the end frame in accordance with this invention. Also, the fixture is illustrated as including welding apparatus to establish the weld connection between the end frame and the bearing plate, but it will be appreciated that other types of connections could be used. Welding is preferred as it provides a secure connection and is particularly well suited to automated procedures.

Structurally, the fixture includes a register ring 58, a cylindrical welding electrode 60 arranged in central opening 62 of the register ring and a core 64 within the electrode. Electrode 60 is connected to one side of an electrical source 66 and is electrically insulated from the register ring by a thin insulating sleeve 68 and from core 64 by insulating sleeve 70. Plunger 82 is supported in core opening 84 on a compression spring 86. The spring is seated at the bottom of opening 84 and normally biases the plunger so that it projects from the opening in the manner illustrated in FIG. 5, but with the plunger being free to move in the opening against the spring.

The outer end of plunger 82 is suitably formed to accept and support bearing 20. In this instance, the bearing being spherical with an inner central bore, the plunger end has a reduced diameter portion 88 concentric with the remainder of the plunger and terminating in a shoulder 90. The bearing fits closely onto the reduced diameter portion and abuts the shoulder. Register ring 58 has a raised edge 92, the inner axial surface 94 of which is machined to be concentric with opening 84 within close tolerances, opening 84 also having a close tolerance fit with the machined plunger 82 so that surfaces 94 and the reduced portion 88 of the plunger are concentric within close tolerances. The fixture also includes an upper welding electrode 96 which is connected to the other side of source 66. It will be appreciated that the electrical source and the circuit for the welding electrodes is shown in a very general manner since the circuit is conventional and well known. Some form of control is provided in the circuit, again this control is shown very generally as switch 98 which permits selective control over operation of the welding cycle.

In assembly of the end frame, the end frame 28 is provided with register tabs 50. The tabs are formed on the end plate in a manner which permits close tolerances to be held with respect to the spacing between the tabs and the diameter on which the tabs are struck. This can be accomplished through a lancing operation. As can be seen in FIGS. 3 and 4, the lanced tabs are deformed from the end frame so that they are offset from the surrounding area of the end frame. The outer radial surface 52 is severed from the end frame and is the termination of a substantial radial extension 50a. Radial extension 50a provides structural rigidity to the tabs so that they are better adapted to performing their locating function both in the motor and in the assembly fixture. The structural rigidity of the tabs can be further enhanced by maintaining a connection between the tab radial sides and the surrounding end frame area by webs 50b and 50c. Thus, the tabs are deformed from the end frame and are severed from the end frame only at their outer radial end so that they provide the structural rigidity required to function as accurate register points. The surfaces 52 are accurately located on the end frame and the structural rigidity of the tabs substantially lessens the possibility of the accurate location being disturbed. The tabs are all of identical construction and the description of one should suffice for all.

As illustrated, two pairs of oppositely arranged tabs 50 are provided. The end plate with the lanced tabs 50 is positioned in the fixture with tab surfaces 52 in engagement with surfaces 94 of the register ring and with annular surface 100 of the end frame resting on and in engagement with the upper end of electrode 60. Retainer spring 42 is placed over plunger 82 and with its peripheral edge 104 in engagement with surface 100 of the end frame. Bearing 20 is placed onto reduced diameter portion 88 of the plunger and rests against shoulder 90. Bearing plate 36 is placed on the bearing with its surface 38 engaging the outer spherical surface of the bearing. Upper electrode 96 is then engaged with the peripheral edge 106 of the bearing plate. In a conventional manner the electrodes 60 and 96 are moved into engagement, the plunger 82 retracting into opening 84 to permit the bearing 20 to move toward engagement on retainer spring 42. This movement of the welding electrodes moves the bearing retainer spring and bearing plate into the desired assembled relationship illustrated in FIG. 1. Switch 98 is closed so that when the bearing plate edge 106 engages surface 100 of the end frame electric current is established in the joint between these two members and, in a conventional manner, results in a weld at that point. It will be appreciated that with the conical surfaces 38 and 44 on the bearing retainer spring and the bearing plate, the spherical surface 48 on the bearing and with the bearing retainer spring and the bearing plate being somewhat free to move with respect to the bearing, these members can arrange themselves concentrically with respect to the inner bore of the bearing as they are moved into engagement. Also contributing to this self-aligning feature is the conical shape of the bearing seat surfaces 38 and 44. This gives the bearing seat surfaces both a radial and an axial component so that they will align themselves on the bearing. The bearing itself is maintained in concentric relationship with bearing ring surfaces 94, and correspondingly registers tab 50, as the parts are moved into their assembled relationship and as the weld is made so that after this operation a precise concentric relationship between the bearing and the tab register surfaces is achieved.

With the end frame assembled, the upper electrode is moved away from the lower electrode and spring 86 moves the assembled end frame out of engagement with the register ring. The end frame is removed and assembled into the stator structure with register tabs 50 engaging the inner surface 56 of housing 54. Bearing 22 is supported in a similarly constructed end frame which is also assembled in the manner described. Housing 54 is concentric with bore 16 of the stator and with register tabs 50 being concentric with the inside diameter of bearing 20, the inside diameter of the bearing is thus concentric with the bore 16. Armature 12, when engaged in the bearing, will also assume a precise concentric relationship with bore 16.

It will be noted that the bearing retainer spring is not connected to either the bearing plate or the end frame but is merely clamped between those two members, the bearing plate being provided with an offset portion 108 to accept peripheral edge 104 of the bearing retainer spring. This arrangement also cooperates in permitting the bearing retainer spring to locate itself with respect to the bearing as the connection is made.

It will be seen that with the provision of tabs 50, the assembly of the end frame and bearing is greatly facilitated while insuring a precise concentric relationship between the bearing and register points on the end frame so that in final assembly the bearing will have the necessary concentric relationship with the stator to precisely support the armature in concentric relationship with respect to the stator. No involved machining or machining fixures are required to achieve the concentric relationship between the armature and stator. The method of assembly is adaptable to automated procedures and requires neither a complicated end frame and bearing assembly or a complicated assembly fixture. After removal of an assembled end frame, the fixture is available for a subsequent assembly procedure. Retainer spring 42 normally rests on surface 100 in assembly, for convenience it is shown above that surface.

An ancillary feature of the end frame is the positioning of tab registers 50 axially inward of the periphery 112 of the end frame. This is effectively and simply achieved with the lancing operation and provides a continuous radial surface 114 which is disposed outwardly of the tab registers and is accurately located with respect to the registers to engage the axial end of housing 54 thereby positioning the tab registers and the end frame axially with respect to the housing. The actual connection between the end frame and the stator can be achieved in any manner, for example by bolts (not shown) which extend through openings (not shown) in the end frame and are anchored in, or pass through, to engage the opposite end frame.

Another feature of the end frame assembly is a particularly effective lubricating arrangement which maintains the simplicity of the end frame construction and does not complicate the assembly techniques. More specifically, the end frame is provided with an axially extending portion 116 surrounding opening 32. This portion is positioned in opposed relation to an extension 118 in the bearing plate, the bearing plate extension being between the weld connection and the conical surface 38. After the assembly of the end frame to the stator is completed as described above a suitable lubricant holding material, such as that commercially available under the name "Permawick," can be injected into the area between the opposed extensions 116 and 118. The "Permawick" material 119 is injected through an opening 117 defined by a recess in the end frame surface 100. This material sets after it is injected and engages the bearing and provides a medium for holding lubricant for the bearing and shaft. Retainer spring 42 is positioned between these extensions and is provided with a series of angularly spaced, radially extending openings 120 which are visible in FIG. 5 and which accommodate the "Permawick" material.

It will also be noted that extension 118 of the bearing plate between the weld connection and the conical surface 38 is provided with a generally axially disposed shoulder 124. This shoulder 124 provides a convenient mounting surface for a mounting ring 126 of rubber, or the like, and of conventional construction.

FIG. 6 illustrates an alternative construction of the peripheral edge 106 of the bearing plate. The bearing plate can be provided with either a continuous projection 128 or a series of projections which have a limited circumferential extension around the peripheral edge of the bearing plate. These projections engage end frame surface 100 during the welding operation and provide a higher resistance joint to better effect the weld connection. The projection is preferably a continuous rib and, when welded, forms a seal with the end frame to prevent leakage of the "Permawick" material.

Although but one embodiment of the present invention has been illustrated and described, it will be apparent to those skilled in the art that various changes and modifications may be made therein without departing from the spirit of the invention or from the scope of the appended claims.

What is claimed is:
1. The method of assemblying a dynamoelectric machine comprising the steps of
   providing a bearing support member with first register means having a preselected orientation on said bearing support member,
   positioning said bearing support member in a fixture including register means and with said first register means locating said bearing support member in said fixture through engagement with said fixture register means,
   supporting a bearing in said fixture in preselected relationship with said fixture register means,
   connecting said bearing to said bearing support member while maintaining said preselected relationship between said bearing and said fixture register means and correspondingly said first register means which engage said fixture register means,
   providing a stator with stator register means having the same preselected relationship with the surface of said stator which will confront a rotor as said fixture means has to said bearing,
   and connecting said bearing support member, with said bearing attached, to said stator with said first register means engaging said stator register means so that said bearing has said preselected relationship with said stator surface and so that a rotor supported by said bearing also has said preselected relationship with said stator surface.

2. The method of claim 1 wherein
   said bearing is arranged in said fixture in concentric relationship with said fixture register means,
   said stator register means is provided in concentric relationship with said stator surface,
   and said bearing is connected to stator in concentric relationship with said stator surface.

3. The method of claim 2 wherein said first register means are formed with a generally radially facing surface at the termination of a generally radial extension.

4. The method of claim 3 wherein said register means are formed from said bearing support member with a substantial radial extension joined along the radially extending edges thereof to the surrounding area of said bearing support member and with the radially facing termination thereof separated from the bearing support member along the extent of said radially facing surface.

5. The method of claim 3 wherein said bearing support member is provided in the form of an end frame and the connection of said bearing to said end frame includes the steps of
   positioning a bearing retainer spring in overlying relationship with a portion of said end frame and on the axis upon which said bearing and fixture register means are concentric,
   positioning a bearing plate in opposed relationship with said retainer spring, in engagement with said bearing, and overlying a portion of said end frame,
   engaging said bearing plate with said end frame and with said bearing held between said bearing plate and said retainer spring,
   and connecting said bearing plate to said end frame and said retainer spring in fixed relation with said bearing to establish the position of said bearing on said end frame.

6. The method of claim 3 wherein said bearing is provided with a generally spherical outer surface and the connection of said bearing to said bearing support member includes the steps of providing a bearing retainer spring having a first bearing seat portion characterized by an extension having an axial and a radial component and positioning said retainer spring in overlying relationship with a portion of said bearing support member and with the center of said first bearing seat portion on the axis upon which said bearing and fixture register means are concentric, providing a bearing plate having a second bearing seat portion characterized by an extension having an axial and a radial and positioning said bearing plate in opposed relationship with said retainer spring and with the center of said second bearing seat portion on the axis upon which said bearing and fixture register means are concentric, engaging said bearing plate with said end frame with said bearing spherical surface engaged between said first and second bearing seat portions to locate said bearing, bearing plate and retainer spring with respect to said end frame, and connecting said bearing plate to said end frame and said retainer spring in fixed relation with said bearing to establish the position of said bearing on said end frame.

7. The method of claim 6 including the step of clamping said retainer spring against said end frame as said bearing plate is connected to said end frame.

8. The method of claim 7 wherein said bearing plate is welded to said end frame.

9. The method of claim 8 wherein said weld is made by welding current in the joint between said end frame and bearing plate and including the step of providing said bearing plate with projections to engage said end frame and increase the resistance contact between said end frame and bearing plate to thereby facilitate said weld.

10. The method of assembling a bearing to an end frame for a dynamoelectric machine and comprising the steps of providing an end frame with first register means having a preselected orientation on said end frame, positioning said end frame in a fixture including register means and with said first register means in engagement with said fixture register means, supporting a bearing in said fixture in concentric relationship with said fixture register means and said first register means, and connecting said bearing to said end frame while maintaining said concentric relationship between said bearing and said fixture register means and, correspondingly, said first register means which engage said fixture register means.

11. A dynamoelectric machine, comprising, in combination, a bearing support member including first register means having a generally radial extension terminating in a generally radially outward facing surface and having a concentric orientation on said bearing support member with respect to the axis of said machine, bearing means supported on said bearing support member in concentric relationship with said first register means, a rotor including a shaft arranged on said axis and engaged in said bearing means, a stator including means defining a bore and said rotor disposed in said bore, means connected to said stator and defining stator register means including radially inward facing surfaces in concentric relationship with said bore, and said bearing support member connected to said stator with said radially outward facing surfaces of said first register means engaging said radially inward facing surfaces of said stator register means to locate and maintain said bearing means and said rotor in concentric relationship with said stator bore.

12. The dynamolectric machine of claim 11 wherein said first register means comprise tab means offset from said bearing support member and having a substantial radial extension joined along the radially extending edges thereof to the surounding area of said bearing support member and terminating in said radially outward facing surface, said radially outward facing surface of said tab means being physically separated from the bearing support member along the extent of said radially outward facing surface.

13. The dynamoelectric machine of claim 12 including a generally tubular housing portion connected to and projecting axially beyond said stator, said tubular portion having a radially inner surface providing said stator register means.

14. The dynamoelectric machine of claim 13 wherein said tab register means are angularly spaced on said bearing support member and said radial surfaces thereof engege the inner surface of said tubular portion at angularly spaced areas thereon.

15. The dynamoelectric machine of claim 13 wherein said bearing support member includes means defining surfaces extending radially and facing axially with respect to said axis, said radial extending, axially facing surfaces offset axially from and disposed radially outward from the radial facing surfaces of said tab register means, said radially extending, axially facing surfaces being in engagement with the axial end of said tubular housing portions and said radially facing surfaces of said tab register means engaging said tubular housing portion axially inward of said housing portion end.

16. The dynamoelectric machine of claim 11 including a generally tubular housing portion projecting axially beyond said stator, said tubular housing portion having a radially inner surface providing said stator register means and an axially facing end edge, and wherein said bearing support member includes means defining surfaces extending radially and facing axially with respect to the axis of said bearing, said radially extending, axially facing surfaces offset axially from and disposed radially outward from said radial facing surfaces of said first register means, said radially extending, axially facing surfaces being in engagement with the axial end edge of said tubular housing portion and said radially facing register means surfaces engaging said radially inner surface of said tubular housing potrion axially inward of said housing portion and edge.

References Cited

UNITED STATES PATENTS

| 2,448,500 | 8/1948 | Turner | 308—72 |
| 2,460,063 | 1/1949 | Cole | 310—258 |
| 2,525,836 | 10/1950 | Schwarz | 310—258 |
| 2,701,318 | 2/1955 | Feiertag | 310—258 |
| 2,792,512 | 5/1957 | Koch | 310—258 |
| 3,013,167 | 12/1961 | Bobula | 310—90 |
| 3,320,660 | 5/1967 | Otto | 29—596 |

WARREN E. RAY, Primary Examiner

U.S. Cl. X.R.

29—596; 310—42, 51